United States Patent

Motohashi

[11] Patent Number: 5,815,081
[45] Date of Patent: Sep. 29, 1998

[54] RADIO PAGING RECEIVER CAPABLE OF PROVIDING A LARGE NUMBER OF ANNOUNCING MODES

[75] Inventor: Teruyuki Motohashi, Tokyo, Japan

[73] Assignee: NEC Corporation, Tokyo, Japan

[21] Appl. No.: 668,147

[22] Filed: Jun. 21, 1996

[30] Foreign Application Priority Data

Jun. 21, 1995 [JP] Japan ................................. 7-153735

[51] Int. Cl.⁶ .................................................. H04Q 7/18
[52] U.S. Cl. ................. 340/825.44; 340/825.69; 340/311.1; 455/31.1; 455/38.1; 370/313
[58] Field of Search ................... 340/825.44, 825.52, 340/825.69, 311.1, 825.48, 825.46; 455/458, 426, 31.2, 31.1, 38.1, 38.2, 38.4, 38.5; 370/312, 313, 314

[56] References Cited

U.S. PATENT DOCUMENTS

| | | | |
|---|---|---|---|
| 4,868,561 | 9/1989 | Davis | 340/825.44 |
| 4,894,649 | 1/1990 | Davis | 340/825.44 |
| 5,287,099 | 2/1994 | Tsunoda | 340/825.44 |
| 5,434,563 | 7/1995 | Kudoh | 340/825.44 |
| 5,495,236 | 2/1996 | Minami | 340/825.44 |
| 5,499,020 | 3/1996 | Motohashi et al. | 340/825.44 |

FOREIGN PATENT DOCUMENTS 5-55985  3/1993  Japan.

*Primary Examiner*—Brian Zimmerman
*Assistant Examiner*—William H. Wilson, Jr.
*Attorney, Agent, or Firm*—Sughrue, Mion, Zinn, Macpeak & Seas, PLLC

[57] ABSTRACT

For carrying out an announcement in response to a call signal which has, as a selected code, one of a plurality of call condition indicating code, a radio paging receiver has a plurality of call condition indicating tables each holding a plurality of announcing modes in correspondence to the call condition indicating codes. Selection is carried out to select, as a selected table, one of the call condition indicating tables. The announcement is carried out in a particular announcing mode which is selected from the announcing modes of the selected table in response to the selected code. It is preferable that the selection is automatically carried out at a time when a current time instant is coincident with a preselected time instant.

4 Claims, 4 Drawing Sheets

| CALL CONDITION INDICATING CODE | ANNOUNCING MODE |
|---|---|
| 0 1 | ALERT No. 1 |
| 0 2 | ALERT No. 2 |
| 0 3 | ALERT No. 3 |
| 0 4 | ALERT No. 4 |
| 0 5 | VIBRATOR |

| CALL CONDITION INDICATING CODE | ANNOUNCING MODE |
|---|---|
| 0 1 | MELODY No. 1 |
| 0 2 | MELODY No. 2 |
| 0 3 | MELODY No. 3 |
| 0 4 | ALERT No. 5 |
| 0 5 | ALERT No. 6 |

RADIO PAGING RECEIVER CAPABLE OF PROVIDING A LARGE NUMBER OF ANNOUNCING MODES

BACKGROUND OF THE INVENTION

This invention relates to a radio paging receiver with a call condition indicating function known in the art. More particularly, the radio paging receiver has a plurality of announcing modes and carries out an announcement in a selected one of the announcing modes when the radio paging receiver is received with a call signal directed thereto.

There is known a conventional radio paging receiver preliminarily equipped with a plurality of announcing units in a housing thereof. Each of the announcing units are for carrying out the announcement in each of the announcing modes in response to the call signal. The announcing units may be a loudspeaker, a vibrator, and a light emitting diode, respectively. Generally, selection is carried out among the announcing modes with operation of a switch which is mounted on an outer peripheral surface of the housing.

It is assumed as a particular case that a possessor of the radio paging receiver has inadvertent omission as regards operation of the switch. In the particular case, the loudspeaker may be driven to carry out the announcement even if the loudspeaker is undesirable for carrying out the announcement.

In order to avoid such trouble, first proposal is made as regards the conventional radio paging receiver in Japanese Patent Prepublication (Kokai or Publication of Unexamined Patent Application) No. 55985/1993 by Kondo. In the first proposal, a particular one of the announcing modes is selected by a slide switch. Only during a time period preliminarily memorized, the announcement is carried out in the particular announcing mode thus selected. After a lapse of the time period, the announcement is carried out in another one of the announcing modes which is previously used.

A second proposal is also made as regards the conventional paging receiver. In the second proposal, the call signal has, as a selected code, one of a predetermined number of call condition indicating codes which are indicative of the announcing modes, respectively. The paging receiver comprises a single table which will be called hereinunder a call condition indicating table and which holds or memorizes the announcing modes in one-to-one correspondence to the call condition indicating codes.

When the radio paging receiver receives the call signal, the call condition indicating table is searched by the use of the selected code as an index. The announcement is carried out according to the result of this search, namely, in a specific one of the announcing modes which is indicated by the selected code.

In the second proposal, a calling party selects the specific announcing mode. The calling party may assume that the possessor is in a situation where the announcement by the loudspeaker is undesirable. In this event, the calling party can indicate that the announcement should be carried out by another one of the announcing modes which is desirable for the possessor.

However, restriction is imposed upon the number of the announcing modes. This is because the number of the call condition indicating codes is predetermined in a paging system which includes such radio paging receivers.

SUMMARY OF THE INVENTION

It is therefore an object of this invention to provide a radio paging receiver with a call condition indicating function, which is capable of providing a large number of announcing modes.

Other objects of this invention will become clear as the description proceeds.

According to this invention, there is provided a radio paging receiver comprising announcing means for carrying out an announcement in response to a call signal which has, as a selected code, one of a plurality of call condition indicating codes, and a plurality of call condition indicating tables. Each of the tables holds a plurality of announcing modes in correspondence to the call condition indicating codes. The radio paging receiver further comprises table selecting means connected to the call condition indicating tables for selecting, as a selected table, one of the call condition indicating tables, and announcement making means connected to the announcing means and the table selecting means for making the announcing means carry out the announcement in a particular announcing mode which is selected from the announcing modes of the selected table in response to the selected code.

BRIEF DESCRIPTION OF THE DRAWING

FIG. 3 shows a first call condition indicating table included in the radio paging receiver of FIG. 1;

FIG. 4 shows a second call condition indication table included in the radio paging receiver of FIG. 1.

DESCRIPTION OF THE PREFERRED EMBODIMENT

Figure 1:
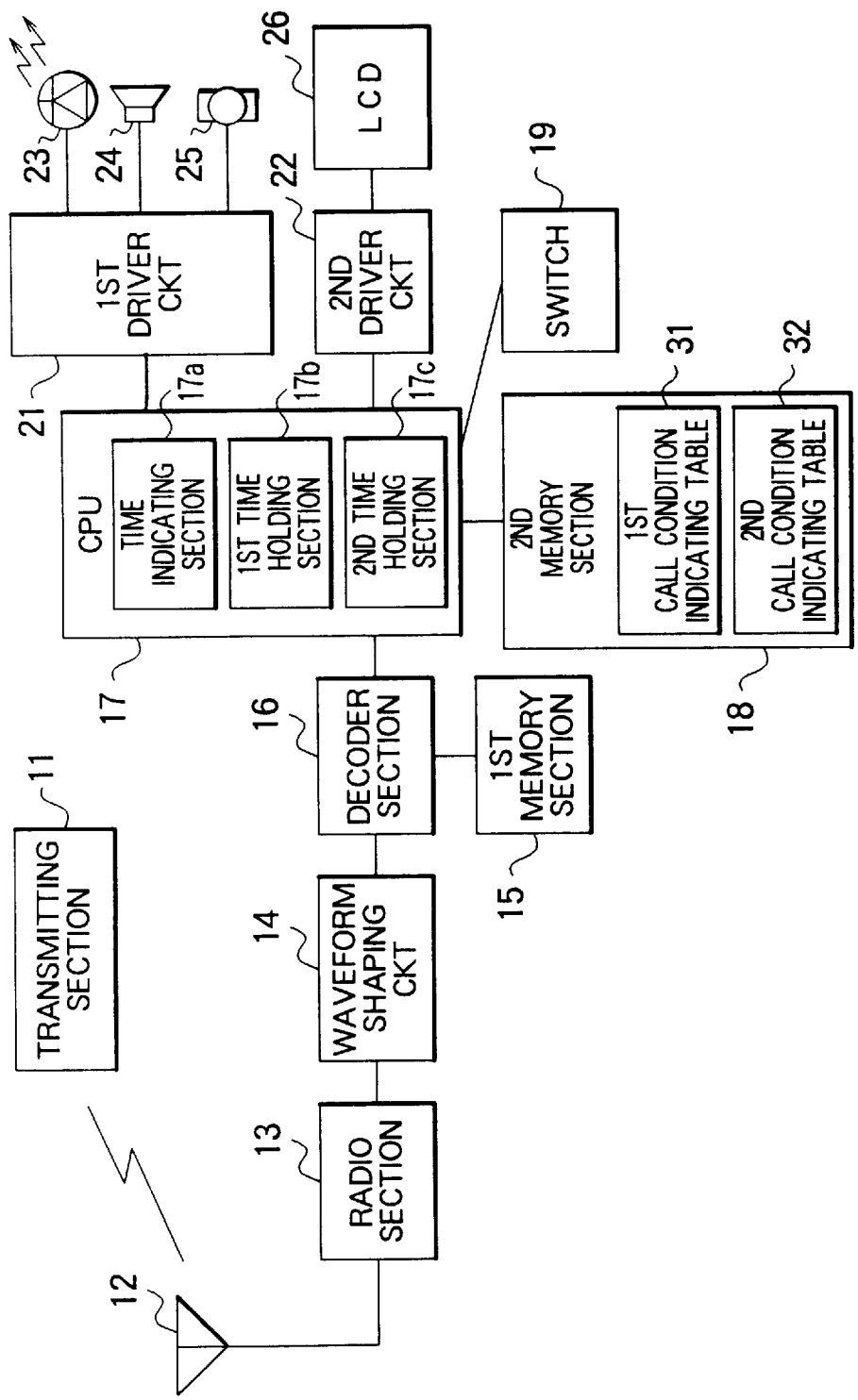
FIG. 1 shows, together with a transmitting station, a block diagram of a radio paging receiver according to an embodiment of this invention.

Referring to FIG. 1, description will be made as regards a radio paging receiver according to an embodiment of this invention. In the manner known in the art, the radio paging receiver is included as one of radio terminals together with a transmitting station 11 in a paging system and is for receiving a radio signal transmitted from the transmitting station 11. The radio paging receiver has a function which is called a call condition indicating function in the art.

A plurality of subscriber substations (not shown) are connected to the transmitting station 11. When a call originates from one of the subscriber substations to the illustrated radio paging receiver, the call is conveyed from the transmitting station 11 to the radio paging receiver by a call signal which having a form of a radio signal.

Figure 2:
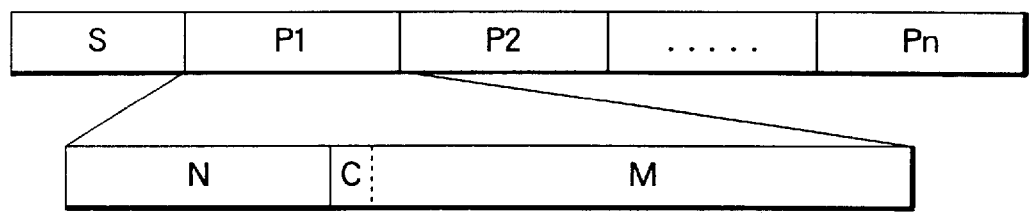
FIG. 2 is a signal format of a radio signal transmitted from a transmitting station.

Turning to FIG. 2 for a short while, the description will be directed to a signal format of the call signal. Each frame of the radio signal comprises a synchronous signal S and a plurality of paging signals P1 to Pn following the synchronous signal S. The synchronous signal S appears at every frame period and is used in synchronizing the radio paging receiver in the manner known in the art. Each of the paging signals P1 to Pn comprises a number part N followed by a message part M. The number part N is for carrying a specific telephone number. The message part M is for carrying a message.

It will be assumed to use the call condition indicating function. In this event, a code part C is added to a start portion of the message part M. The code part C is for carrying, as a selected code, one of a plurality of call condition indicating codes relating to the call condition indicating function.

Referring back to FIG. 1, the radio paging receiver comprises an antenna 12 for receiving the call signal, a radio section 13 connected to the antenna 12 for converting or demodulating the call signal into a baseband or demodulated signal, a waveform shaping circuit 14 connected to the radio section 13 for shaping a waveform of the demodulated signal into a shaped signal, a first memory section 15 for preliminarily memorizing a assigned telephone number assigned to the radio paging receiver, and a decoder section 16 connected to the waveform shaping circuit 14 and the first memory section 15 for comparing the specific telephone number with the assigned telephone number in response to the shaped signal to produce a received signal only when the specific telephone number is coincident with the assigned telephone number. The received signal is supplied to a central processing unit (CPU) 17 which comprises a time indicating section 17a, a first time holding section 17b, and a second time holding section 17c. The time indicating section 17a is for indicating a current time instant. The first time holding section 17b is for holding a first preselected time instant. The second time holding section 17b is for holding a second preselected time instant.

In the manner which will presently be described, the radio paging receiver further comprises a second memory section 18, a switch 19, a first driver circuit 21, a second driver circuit 22, a light emitting diode (LED) 23, a loudspeaker 24, a vibrator 25, and a liquid crystal display (LCD) 26.

The second memory section 18 is connected to the CPU 17 for memorizing first and second call condition indicating tables 31 and 32 which will be called hereunder a first and a second tables and which will later become clear. The switch 19 is connected to the CPU 17 and is for selecting at least one of the LED 23, the loudspeaker 24, and the vibrator 25, for selecting one of the first and the second tables 31 and 32, and for setting each of the first and the second preselected time instants. The first driver circuit 21 is connected to the CPU 17 and is for driving the LED 23, the loudspeaker 24, and the vibrator 25 to cause an announcement in the manner known in the art. The second driver circuit 22 is connected to the CPU 17 and is for driving the LCD 26 to display thereon in the manner known in the art. A combination of the first driver circuit 21, the second driver circuit 22, the LED 23, the loudspeaker 24, the vibrator 25, and the LCD 26 is referred to as an announcing arrangement.

Now, it will be assumed here that a possessor of the radio paging receiver selects, as a selected unit, at least one of the LED 23, the loudspeaker 24, and the vibrator 25 by operating the switch 19. Supplied with the received signal from the decoder section 16, the CPU 17 judges whether or not the code part is contained in the call signal. When the code part is not contained in the call signal, the radio paging receiver carries out a conventional operation in which the CPU 17 makes the first driver circuit 21 drive the selected unit. Simultaneously, the possessor can select that the CPU 17 makes the second driver circuit 22 drive the LCD 19 with operation of the switch 19. When it is judged that the code part is contained in the call signal, the CPU 17 carries out a particular operation which will far later be described in detail.

Turning to FIGS. 2 and 3, the description will be made as regards the first and the second tables 31 and 32. Each of the first and the second tables 31 and 32 holds five announcing modes in one to one correspondence to the call condition indicating codes "01", "02", "03", "04", and "05". The announcing modes are different between the first and the second tables 31 and 32 although the call condition indication codes "01" through "05" are assigned to each of the first and the second tables 31 and 32.

The call condition indication code "01" corresponds to the announcing mode "ALERT No. 1" in the first table 31 on one hand and to the announcing mode "MELODY No. 1" in the call condition indication table B 2b on the other hand. The call condition indication code "02" corresponds to the announcing mode "ALERT No. 2" in the first table 31 on one hand and to the announcing mode "MELODY No. 2" in the second table 32 on the other hand. The call condition indication code "03" corresponds to the announcing mode "ALERT No. 3" in the first table 31 on one hand and to the announcing mode "MELODY No. 3" in the second table 32 on the other hand. The call condition indication code "04" corresponds to the announcing mode "ALERT No. 4" in the first table 31 on one hand and to the announcing mode "ALERT No. 5" in the second table 32 on the other hand. The call condition indication code "05" corresponds to the announcing mode "VIBRATOR" in the first table 31 on one hand and to the announcing mode "ALERT No. 6" in the second table 32 on the other hand.

Figure 5:
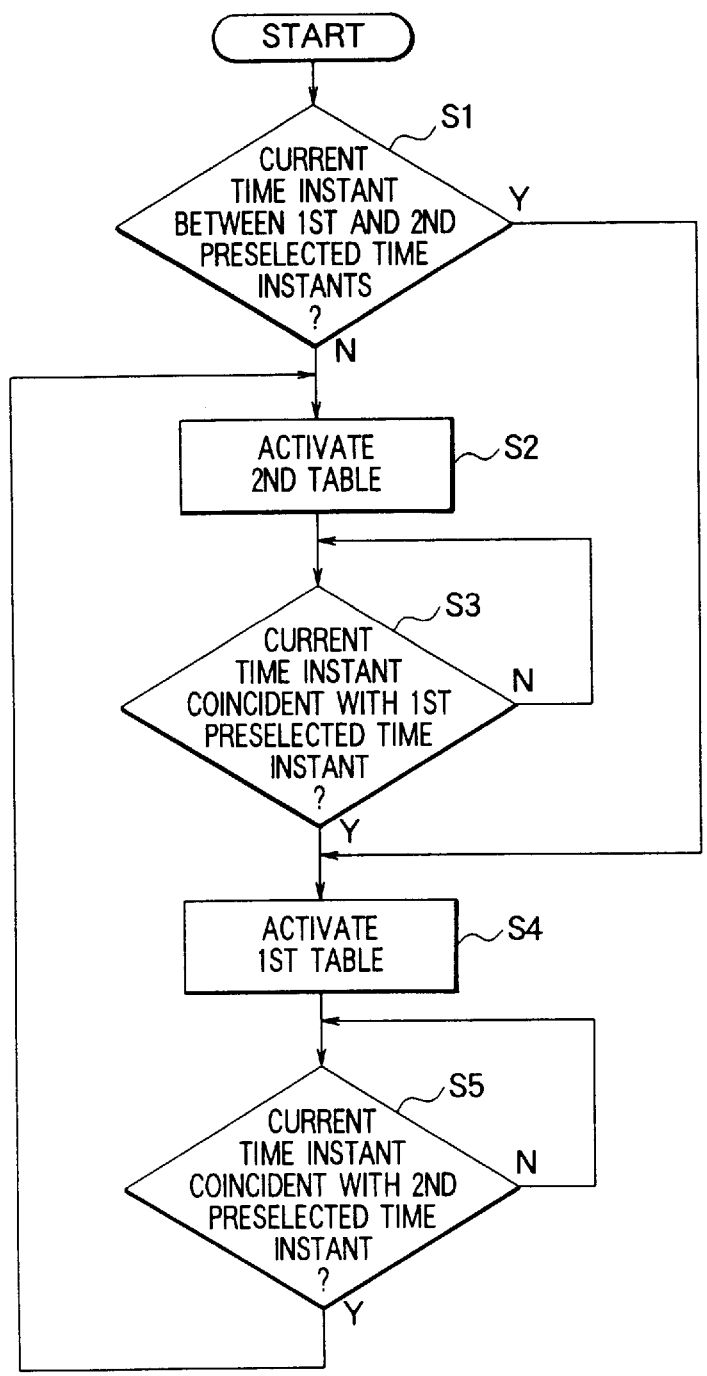
FIG. 5 is a flow chart for describing an operation of a CPU included in the radio paging receiver of FIG. 1.

Referring to FIG. 5 together with FIG. 1, the description will be directed to the particular operation of the radio paging receiver. It is assumed here that the first preselected time instant is selected to indicate 9 a.m. and that the second preselected time instant is selected to indicate 5 p.m. In this event, it will be noted that the the first preselected time instant is previous to the second preselected time instant.

In response to an operation of the switch 19, a start is followed by a first step S1 at which the CPU 17 judges whether or not the current time instant is between the first and the second preselected time instants, namely, 9 a.m. and 5 p.m. in the day. When the CPU 17 judges at the first step S1 that the current time instant is between the first and the second preselected time instants, the first step S1 is followed by a fourth step S4 which will later be described.

When the CPU 17 judges at the first step S1 that the current time instant is not between the first and the second preselected time instants, the first step S1 is followed by a second step S2 at which the CPU 17 accesses the second memory section 18 to activate the second table 32. More particularly, the CPU 17 selects or designates the second table 32 as a selected table while the current time instant is not between the first and the second preselected time instants.

Supplied with the received signal from the decoder section 16, the CPU 17 selects with reference to the second table 32, as a particular announcing mode, one of the announcing modes which corresponds to the selected code. Therefore, the CPU 17 makes the announcing arrangement carry out the announcement in the particular announcing mode.

The second step S2 is followed by a third step S3 at which the CPU 17 judges whether or not the current time instant is coincident with the first preselected time instant, namely, 9 a.m. Only when the current time instant is coincident with the first preselected time instant, the third step S3 is followed by the fourth step S4.

At the fourth step S4, the CPU 17 accesses the second memory section 18 to activate the first table 31. More particularly, the CPU 17 selects or designates the first table 31 as the selected table when the current time instant is coincident with the first preselected time instant, namely, 9 a.m.

Supplied with the received signal from the decoder section 16, the CPU 17 selects with reference to the first table 31, as the particular announcing mode, one of the announcing modes which corresponds to the selected code.

Therefore, the CPU 17 makes the announcing arrangement carry out the announcement in the particular announcing mode.

The fourth step S4 is followed by a fifth step S5 at which the CPU 17 judges whether or not the current time instant is coincident with the second preselected time instant, namely, 5 p.m. Only when the the current time instant is coincident with the second preselected time instant, the fifth step S5 returns to the second step S2 in which the CPU 17 accesses the second memory section 18 to activate the second table 32.

More particularly, the first table 31 is automatically activated from 9 a.m. to 5 p.m. On the other hand, the second table 32 is automatically activated from 5 p.m. to 9 a.m. in the following day.

On carrying out each of the first, the third, and the fifth steps S1, S3, and S5, the CPU 17 will be referred to as a time detecting arrangement. On carrying out each of the second and the fourth steps S2 and S4, the CPU 17 is referred to as a designating arrangement. A combination of the time indicating section 17a, the first and the second time holding section 17b and 17c, the time detecting arrangement, and the designating arrangement is referred to as a table selecting arrangement.

Even under the above-mentioned preselected conditions, the CPU 17 is operable to switch the first and the second tables 31 and 32 from one to the other when switching from one to the other of the first and the second tables 31 and 32 is indicated by the operation of the switch 19. In this event, the CPU 17 detects the operation of the switch 19 to produce an operation detection signal and may be referred to as an operation detecting arrangement. The designating arrangement designates, as the selected table, a predetermined one of the first and the second tables 31 and 32 in response to the operation detection signal.

As described above, the first and the second tables 31 and 32 are preliminarily memorized in the second memory section 18. When the CPU 17 judges that the current time instant is coincident with each of the first and the second preselected time instants that are preliminarily selected by the operation of the switch 19, automatic switching is carried out from the first table 31 into the second table 32 or from the second table 32 into the first table 31. One of the first and the second tables 31 and 32 thus selected is used as the selected table in determining the particular announcing mode for the reception message. Thus, the call condition indications are changed, for example, between working hours and private hours. It is therefore possible to improve a serviceability of the radio paging receiver and to use an increased number of available call condition indications beyond the restriction imposed on a system.

While the present invention has thus far been described in connection with a few embodiments thereof, it will readily be possible for those skilled in the art to put this invention into practice in various other manners. For example, the number of the call condition indication tables may be three or more within a capacity range of the second memory section. Although the number of the switching time instants is two in the foregoing, three or more switching time instants can be set even if the call condition indication tables are two in number. Furthermore, it is possible to increase the number of switching time instants in correspondence to the number of the call condition indication tables.

What is claimed is:

1. A radio paging receiver comprising:

announcing means for carrying out an announcement in response to said radio paging receiver receiving a call signal having one of a plurality of call condition indicating codes;

a plurality of call condition indicating tables, each having a plurality of announcing modes corresponding to said plurality of call condition indicating codes such that one of said plurality of call condition indicating codes may correspond to more than one announcing mode;

table selecting means connected to said plurality of call condition indicating tables for selecting one of said plurality of call condition indicating tables; and announcement actuating means connected to said announcing means and said table selecting means for actuating said announcing means according to one of said plurality of announcing modes corresponding to said received condition indicating code of said selected call condition indicating table.

2. A radio paging receiver as claimed in claim 1, wherein said table selecting means comprises:

time indicating means for indicating a current time instant;

time holding means for holding a preselected time instant;

time detecting means connected to said time indicating means and said time holding means for detecting whether said current time instant is coincident with said preselected time instant, said time detecting means producing a time detection signal when said current time instant is coincident with said preselected time instant; and designating means connected to said time detecting means and said plurality of call condition indicating tables for designating a predetermined one of said plurality of call condition indicating tables in response to said time detection signal.

3. A radio paging receiver as claimed in claim 1, wherein said table selecting means comprises:

time indicating means for indicating a current time instant;

first time holding means for holding a first preselected time instant;

second time holding means for holding a second preselected time instant;

time detecting means connected to said time indicating means and said first and said second time holding means for detecting whether said current time instant is between said first and said second preselected time instants, said time detecting means producing a time detection signal when said current time instant is between said first and said second preselected time instants; and designating means connected to said time detecting means and said plurality of call condition indicating tables for designating a predetermined one of said plurality of call condition indicating tables in response to said time detection signal.

4. A radio paging receiver as claimed in claim 1, wherein said table selecting means comprises:

a switch being manually operated;

operation detecting means connected to said switch for detecting whether said switch is operated, said operation detecting means producing an operation detection signal when said switch is operated; and designating means connected to said operation detecting means and said plurality of call condition indicating tables for designating a predetermined one of said plurality of call condition indicating tables in response to said operation detection signal.

* * * * *